May 9, 1933.  F. J. KUBLER  1,907,832
COWL PILLAR FOR VEHICLE BODIES
Filed March 27, 1929
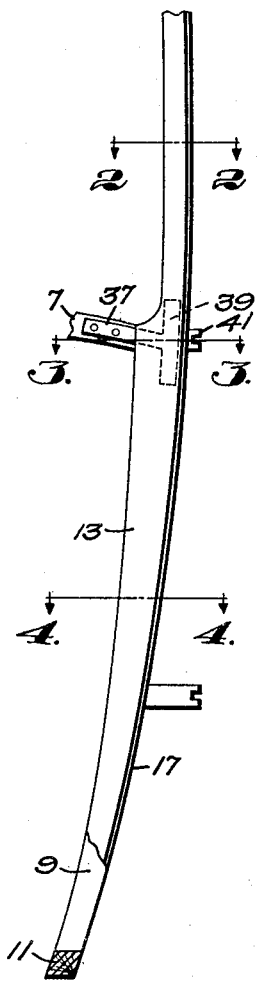
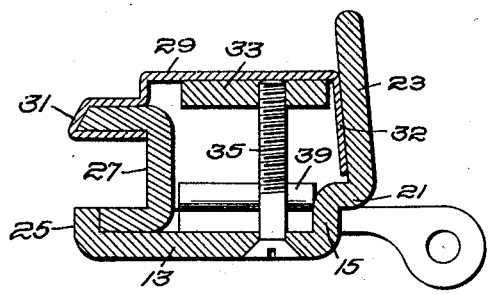
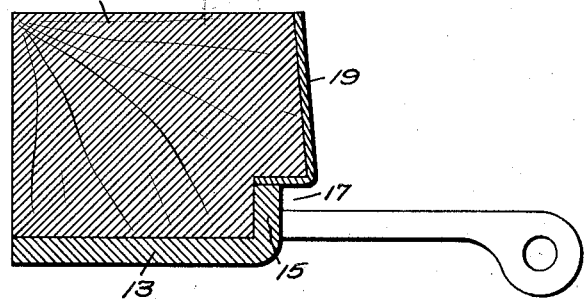
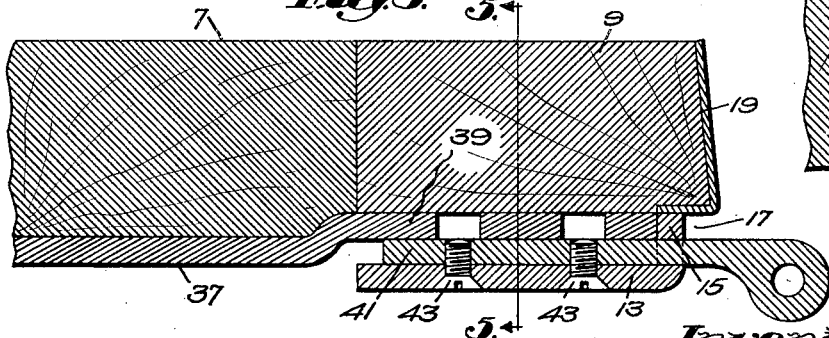
Inventor:
Frederick J. Kubler Patented May 9, 1933

1,907,832

UNITED STATES PATENT OFFICE

FREDERICK J. KUBLER, OF NEW YORK, N. Y., ASSIGNOR TO A. S. CAMPBELL COMPANY, OF EAST BOSTON, MASSACHUSETTS, A CORPORATION OF MASSACHUSETTS

COWL PILLAR FOR VEHICLE BODIES

Application filed March 27, 1929. Serial No. 350,399.

This invention relates to the construction of the cowl pillars of vehicle bodies which above the belt line are of metallic construction and of restricted dimension, and the object is to provide an improved construction for such a pillar formed chiefly of metallic stampings. My invention will be well understood by reference to the following description of an illustrative embodiment thereof shown by way of example in the accompanying drawing, wherein:

Fig. 1 is a partial section of the framework of a vehicle body on a plane intersecting the forward door sill and disclosing in elevation the body pillar and cowl bar as seen from the interior of the body, the upper portion of the pillar being broken away;

Figs. 2, 3 and 4 are sections on a larger scale taken on the like numbered lines of Fig. 1 respectively; and Fig. 5 is a section on the line 5—5 of Fig. 3.

Referring to the drawing, the body shown by way of example is of composite construction comprising a cowl frame including the cowl bar 7 joining and supported by the wooden uprights 9 extending from the sill 11 to the cowl. To the rear face of the member 9 is secured the body of the pillar which extends above the belt line as a metallic structure to support the roof. The main body of the pillar is conveniently formed of a suitable heavy stamping of steel and embodies the web 13 secured to the rear face of the member 9 which may be reinforced by a forwardly extending flange 15 overlying the inner face of a rabbet 17 at the exterior rear corner of the pillar, which rabbet is adapted to receive the overlap flange of the door. The cowl panel 19 may be flanged about the forward face of this rabbet.

The web 13 and flange 15 extend above the belt to the roof (see Fig. 2) with such modification in shape or width as may be desired, and may be extended above the belt to provide the forward wall 21 of the rabbet for the door overlap and a wall 23 giving the profile of the side of the exposed portion of the pillar above the belt. The interior edge of the web 13 is preferably reinforced above the belt and herein I have shown it as provided with a forwardly extending flange 25 forming an angle in which is seated the rear flange of a channel 27, the flanges of which face inwardly and provide a guide for a windshield of the sliding type. This channel may be welded in position.

The construction of the main body of the pillar above the belt just described is an example of an assemblage of stamped angular sections of structural strength. In the form described obviously this body portion is open at the front. To complete the contour of the pillar and give it a proper appearance of solidity, I preferably utilize a detachable member which may be readily assembled with the body portion by a movement of lateral approach. This member 29 herein takes the form of a relatively light sheet metal stamping which is preferably provided with a hook-shaped edge 31 adapted to hook around the forward flange of the channel 27 both to cover the same and to aid in positioning the member 29. The exterior side may be provided with a flange 32 adapted to seat on the inner face of flange 23. To secure the sheet metal member 29 in position threaded blocks 33 may be welded to the rear face of the same and these are adapted to receive screws 35 entered from the rear face of the web 13 and tapping into the same. In assembling the parts the hook-shaped edge 31 is hooked over a portion of the body of the pillar and the screws 35 serve to draw the contour-giving member 29 home to its seat.

It will be noted that the reinforcement provided at the interior edge of the pillar by the channel 27 stops at the cowl. To reinforce the pillar at this point I may utilize suitable means which also serve to incorporate it with the cowl structure, which latter is herein exemplified by the cowl bar 7. Thus I have shown in Figs. 1 and 3 an anchor comprising a stamping of generally T shape, the member 37 corresponding to the upright of the T extending along and being secured to the rear of the cowl bar 7 while the member 39 corresponding to the crossbar of the T may lie against the forward face of the web 13 and be welded thereto, thus to provide an efficient fish-plate for the pillar substantially at the belt line and reinforcing it at the point where the upper portion of the pillar rises from the cowl.

When the pillar is utilized as a hinge pillar the part 39 of the anchorage member may also be utilized to aid in supporting the center hinge. Referring to Fig. 3 I have herein shown the leaf 41 of this hinge which is carried by the body as resting against the forward face of the web 13 and secured thereto by screws 43 entering the pillar through its rear face and tapping into the leaf. As shown best in Fig. 5, the central portion of the part 39 may be offset to receive the leaf between it and the web 13 whereby the first receives a firm support from the two parts, the extremities of the strap or fish-plate 39 being welded to web 13 above and below this offset in the manner already explained.

I am aware that the invention may be embodied in other specific forms without departing from the spirit or essential attributes thereof, and I therefore desire the present embodiment to be considered in all respects as illustrative and not restrictive; reference being had to the appended claims rather than to the foregoing description to indicate the scope of the invention.

I claim:

1. In a closed vehicle a frame including a sheet metal body pillar having a transverse web, a hinge having a leaf overlying said web at the side remote from the door opening and a strap overlying said leaf and secured to said web at either side of the leaf, said strap having a transversely extending arm anchored to another part of the frame of the vehicle.

2. In a closed vehicle a frame including a cowl bar and a stamped metal body pillar comprising a transverse web and an exterior flange extending at the cowl from a point below the belt to the roof, means providing an interior flange above the belt, a member bridging said flanges and defining the exterior contour of the pillar above the belt, and a fish-plate for said web crossing the line of the belt received in the space between said flanges and having a lateral extension anchoring the pillar to the cowl bar.

3. In a closed vehicle a forward corner pillar comprising a metal stamping having a transverse web and an exterior flange, an inwardly facing channel at the interior edge of said web providing a guide for the windshield, and a member defining the contour of the forward face of said pillar extending between said channel and flange.

4. In a closed vehicle a forward corner pillar comprising a metal stamping having a transverse web and an exterior flange, an inwardly facing channel at the interior edge of said web providing a guide for the windshield, and a sheet metal member defining the contour of the forward face of the pillar having a hook-like edge to engage about the forward edge of said channel and mechanical fastening devices for securing said member seated on said flange.

5. In a closed vehicle a forward corner pillar comprising a unitary assemblage of stamped angular sections and a sheet metal member adapted to be assembled therewith by a movement of lateral approach and defining the contour of the forward face of the pillar, said member having a hook-like edge to engage an edge portion of said assemblage and mechanical fastening devices remote from the edge for seating said member in position with its edge so engaged.

6. In a closed vehicle a forward corner pillar comprising a stamped metal body portion including a transverse web and forwardly directed stiffening flanges, and a sheet metal member adapted to be assembled therewith by a movement of lateral approach and cooperating with said flanges to complete the contour of the pillar and in itself defining the contour of the forward face thereof, said member having a hook-like edge to engage about an edge portion of said body and mechanical fastening devices remote from the edge for seating said member in position with its edge so engaged.

7. In a closed vehicle a forward corner pillar comprising a body portion of stamped metal including a transverse web, an exterior, forwardly extending flange and an interior portion presented to the side of the windshield, and a sheet metal member defining the forward contour of the pillar and adapted to be assembled therewith by a movement of lateral approach, said member having a hook-like edge engaging said interior portion and mechanical fastening devices remote from said edge for securing the member in position and holding its edge in such engagement.

In testimony whereof, I have signed my name to this specification.

FREDERICK J. KUBLER.